United States Patent
Gabusi

(10) Patent No.: US 12,358,676 B2
(45) Date of Patent: Jul. 15, 2025

(54) METHOD AND APPARATUS FOR AUTOMATICALLY STRETCHING AN OPENING FLAP OF CLOSED PACKAGINGS

(71) Applicant: I.M.A. INDUSTRIA MACCHINE AUTOMATICHE S.P.A., Ozzano Dell'Emilia (IT)

(72) Inventor: Gabriele Gabusi, Ozzano Dell'Emilia (IT)

(73) Assignee: I.M.A. INDUSTRIA MACCHINE AUTOMATICHE S.P.A., Ozzano Dell'Emilia (IT)

(*) Notice: Subject to any disclaimer, the term of this patent is extended or adjusted under 35 U.S.C. 154(b) by 34 days.

(21) Appl. No.: 18/279,659

(22) PCT Filed: Jan. 25, 2022

(86) PCT No.: PCT/IT2022/050005
§ 371 (c)(1),
(2) Date: Sep. 1, 2023

(87) PCT Pub. No.: WO2022/185347
PCT Pub. Date: Sep. 9, 2022

(65) Prior Publication Data
US 2024/0150059 A1    May 9, 2024

(30) Foreign Application Priority Data
Mar. 1, 2021   (IT) .......................... 102021000004685

(51) Int. Cl.
B65B 69/00    (2006.01)
B25J 15/06    (2006.01)

(52) U.S. Cl.
CPC ....... *B65B 69/0008* (2013.01); *B25J 15/0616* (2013.01); *B65B 69/0033* (2013.01); *B65B 69/0025* (2013.01)

(58) Field of Classification Search
CPC ............ B65B 69/0008; B65B 69/0033; B65B 69/0025; B25J 15/0616
(Continued)

(56) References Cited

U.S. PATENT DOCUMENTS 3,889,442 A * 6/1975 Grahn .................... B65B 43/38
414/412
4,134,508 A * 1/1979 Burdett, Jr. ......... B65B 69/0008
414/412
(Continued)

FOREIGN PATENT DOCUMENTS

DE   102011080289 A1 *  2/2013  ......... B65B 69/0008
EP       0625465           9/1993
(Continued)

OTHER PUBLICATIONS

International Search Report filed in PCT/IT2022/050005 mailed Dec. 5, 2022.

*Primary Examiner* — Anna K Kinsaul
*Assistant Examiner* — Mobeen Ahmed
(74) *Attorney, Agent, or Firm* — RANKIN, HILL & CLARK LLP

(57) ABSTRACT

An apparatus for automatically stretching an opening flap of packaging containing at least one object includes suction gripping members configured to cooperate selectively and at least temporarily, but in a stable way, with the packaging to make the opening flap able to be identified and gripped for a subsequent processing thereof.

14 Claims, 4 Drawing Sheets

(58) Field of Classification Search
USPC .......................................................... 53/492
See application file for complete search history.

(56) References Cited

U.S. PATENT DOCUMENTS

| | | | | |
|---|---|---|---|---|
| 4,158,417 A * | 6/1979 | Inoue | ................... | B65B 69/0033 |
| | | | | 414/412 |
| 4,207,021 A * | 6/1980 | Burdett, Jr. | ......... | B65B 69/0008 |
| | | | | 414/412 |
| 5,048,267 A * | 9/1991 | Kudo | ................... | B65B 69/0033 |
| | | | | 414/412 |
| 5,052,876 A * | 10/1991 | Tateno | ................ | B65B 69/0033 |
| | | | | 414/412 |
| 5,613,824 A * | 3/1997 | Kato | ................... | B65B 69/0008 |
| | | | | 141/330 |
| 6,189,298 B1 * | 2/2001 | Kuji | ................... | B65B 69/0033 |
| | | | | 53/381.2 |
| 6,725,631 B2 * | 4/2004 | Skrak | ................... | A22C 11/003 |
| | | | | 53/381.2 |
| 9,067,699 B2 * | 6/2015 | Anatrini | ............. | B65B 69/0008 |
| 11,511,903 B2 * | 11/2022 | Franke | ................ | B65B 69/0008 |
| 2004/0099110 A1 * | 5/2004 | Cere | ................... | B65B 69/0033 |
| | | | | 83/559 |
| 2006/0054637 A1 * | 3/2006 | Doogan | .............. | B65B 69/0008 |
| | | | | 222/181.2 |
| 2007/0062163 A1 * | 3/2007 | Cook | ...................... | B65B 43/60 |
| | | | | 53/381.6 |
| 2015/0314903 A1 * | 11/2015 | Aya | ..................... | B65B 69/0008 |
| | | | | 414/412 |
| 2016/0250757 A1 * | 9/2016 | Staab | ....................... | B25J 15/00 |
| | | | | 294/183 |
| 2018/0079539 A1 * | 3/2018 | Borgström | ............ | B65B 43/465 |
| 2019/0039838 A1 * | 2/2019 | Curhan | ................ | B25J 15/0616 |
| 2019/0177019 A1 * | 6/2019 | Trebbi | .................... | B65B 43/50 |
| 2019/0177026 A1 * | 6/2019 | Trebbi | .................... | B65B 43/30 |
| 2020/0172280 A1 * | 6/2020 | Franke | ................ | B65B 69/0008 |
| 2021/0086936 A1 * | 3/2021 | Nishigaito | .......... | B65B 69/0033 |
| 2021/0292032 A1 * | 9/2021 | Trebbi | ................ | B65B 69/0058 |
| 2022/0111538 A1 * | 4/2022 | Tsujimori | ............ | B25J 15/0071 |
| 2022/0219857 A1 * | 7/2022 | Tsujimori | ............... | B25J 15/009 |
| 2022/0274248 A1 * | 9/2022 | Yoshikuwa | ............. | B25J 13/00 |

FOREIGN PATENT DOCUMENTS

| | | | | |
|---|---|---|---|---|
| EP | 0625465 A2 * | 9/1993 | ............ | B29B 17/02 |
| EP | 1923315 | 5/2008 | | |
| EP | 1923315 A1 * | 5/2008 | ............ | A22C 17/00 |
| EP | 3666673 | 6/2020 | | |
| JP | H 02152643 | 6/1990 | | |
| JP | H 05294305 | 11/1993 | | |

* cited by examiner

METHOD AND APPARATUS FOR AUTOMATICALLY STRETCHING AN OPENING FLAP OF CLOSED PACKAGINGS

FIELD OF THE INVENTION

The present invention concerns a method and corresponding apparatus for automatically stretching an opening flap of closed packagings, such as for example bags, sacks or sachets of thin and flexible material, such as plastic, paper, fabric, or suchlike, containing objects, for example, but not only, containers, or supports, for bottles, vials, flasks, or suchlike, in the chemical, medical and pharmaceutical sectors, in order to facilitate the identification of the opening flap to make it available for a subsequent processing, in particular for cutting the flap itself.

BACKGROUND OF THE INVENTION

It is known that in the chemical, medical and pharmaceutical sectors, products and substances can be packaged inside dedicated containers, suitable to contain single or multiple doses, to facilitate the operations of sorting and administering said doses.

These known containers can be for example bottles, flasks, vials, syringes, cartridges, for example those used in the syringes themselves for administering anesthetics, or other drugs, and such like.

These known containers are transported, and often filled, by disposing them neatly inside racks, or trays, also known to persons of skill in the art by the English term "nest", housed inside slightly larger trays, also known to persons of skill in the art by the English term "tub".

To guarantee the protection of the contents of the containers from the risk of external contamination and to prevent the leakage of substances contained inside the containers, for example following breakage or damage during transport, the tubs are sealed inside a first packaging, or bag, usually made of thin, flexible polymeric material, or also with filter/tyvek paper.

The first bag containing the tub is in turn sealed inside a second packaging, or bag, also made of thin and flexible polymeric material, to increase the safety factor, to facilitate transport and to also allow, for example, to apply barcodes or QR codes on the second bag, which will make the automated recognition of the contents of the bags much faster.

This kind of packaging is very efficient in automatic processing lines, where the various industrial machines and robots can recognize and process the various sealed tubs inside the bags without requiring the intervention of external operators, guaranteeing a high speed of execution and a high level of safety in the process, especially when one has to operate in a sterile environment.

To extract the individual tubs from the two bags it will therefore be sufficient for an operator, or an automated machine, to identify the opening flap of each bag, which is usually disposed on one side of the latter, to cut it and to extract the contents.

However, especially when an automated machine is used, the identification of the opening flap could be particularly difficult, in the event that it has undergone deformation or wrinkling, sometimes making it difficult, or even impossible, to automatically recognize the flap itself and to open it, for example by means of a cut.

In particular, an apparatus is known for orienting a rigid or semi-rigid object contained in a bag, in which rotating brushes are used, which allow the object to be oriented in a determinate direction, so that the opening flap is positioned to then be cut by rubbing it against the rotating brushes, which however generate many particles, which pollute the environment, usually sterile, in which these apparatuses usually operate.

This known apparatus is also not very suitable when it comes to moving delicate or fragile objects, containing chemical and/or pharmaceutical products. Furthermore, the relative height between the rotating brushes should be constantly modified and adapted to the actual sizes of the bags to be processed, so the apparatus is not very efficient and is unreliable.

An apparatus is also known which, in order to identify the opening flap of a sealed bag, is provided with a pointed tubular element, or needle, which is inserted inside the bag itself to blow air under pressure into it and inflate it, like a balloon, to facilitate the identification of the opening flap to be cut. The insertion of the needle inside the sealed bag implies that it must be sterilized before each use, thus making the corresponding method too long and laborious.

However, even this solution is not very suitable when it is necessary to process packagings and containers that contain chemical and/or pharmaceutical substances inside them, which could, for example, react with the air blown in, thus compromising their quality, and in some cases their usability.

Also known is an apparatus for the automatic processing of packagings configured to work in controlled environments at pressures below atmospheric pressure, in so-called "vacuum" environments. In fact, creating a vacuum in the environment where the packaging is contained causes an expansion of the volume of air contained inside it, which causes the external surfaces of the latter to stretch and makes subsequent identification of the opening flap possible.

However, this known apparatus is very complex and expensive, because it requires a plant to create a vacuum, or an adequate depression, and to keep the working environments airtight; its operation is also particularly complex, and therefore expensive, also from the point of view of maintenance.

Furthermore, an apparatus is known having a rotating gripper suitable to grip a portion of the packaging, rotating on itself, then sliding a part of the packaging around the object contained inside it. However, this known apparatus is not suitable to effectively identify the opening flap, especially if the packaging is particularly deformed or crumpled.

So-called "extension" apparatuses are also known, which provide to make the packaging containing an object pass under a fixed mechanical arm, for example by moving the object on conveyor belts, the compressing action of which extends the external surface of the containing bag.

This type of solution has the disadvantage that it is unsuitable in the event that the objects contained inside the bags are rigid, and therefore not very suitable for deformation, thus risking even irreparably damaging their contents.

Also in other technical fields, different from the chemical, medical and pharmaceutical ones, solutions are known for automatically processing groups of objects wrapped in a packaging by means of suction cups connected to a suction system.

For example, JPH02152643A describes a solution that provides to cut the packaging wrapped around a stack of printed sheets and to insert a rod inside it to prevent the operations carried out on the packaging from damaging the sheets contained inside it.

JPH05294305A describes a solution which provides to automatically replace a protective film of a packaged object with a new protective film.

EP0625465A2 describes a solution to automatically remove a protective sheet disposed in contact with the objects stacked on a pallet and disposed inside the packaging film with which the pallet is usually tightly wrapped.

These solutions are also very bulky and are not suitable to process packagings containing delicate or fragile objects, for example made of glass, containing chemical and/or pharmaceutical products.

There is therefore a need to provide an apparatus able to automatically stretch an opening flap of a closed packaging containing one or more objects, especially containers for the pharmaceutical, medical and/or chemical sectors, in order to facilitate the identification of the opening flap, which overcomes at least one of the disadvantages of the state of the art, and which is able to operate on an automated processing line, especially when processing in a sterile environment is required.

One purpose of the present invention is therefore to perfect a method and to provide an apparatus for automatically stretching an opening flap of a closed packaging containing at least one object, for example a container for the pharmaceutical, medical and/or chemical sectors, in order to facilitate the identification of the opening flap of the packaging.

Another purpose of the present invention is to perfect a method and to provide an apparatus for automatically stretching an opening flap of a closed packaging containing at least one object, for example a container for the pharmaceutical, medical and/or chemical sectors, which can function in an automated manner and without the need for intervention by an operator.

Another purpose of the present invention is to perfect a method and to provide an apparatus for automatically stretching an opening flap of a closed packaging containing at least one object, for example a container for the pharmaceutical, medical and/or chemical sectors, which guarantee high hygienic standards, and which therefore do not subject the contents to the risk of contamination.

Another purpose of the present invention is to perfect a method and to provide an apparatus for automatically stretching an opening flap of a closed packaging containing at least one object, for example a container for the pharmaceutical, medical and/or chemical sector, without the risk of damaging its contents.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, a method for automatically stretching an opening flap of a closed packaging, containing inside it, with ample clearance, at least one object, wherein the packaging is provided with a first external surface and with the opening flap, comprises at least the following steps:

a) preparing a manipulator member provided with first gripping means configured to selectively and temporarily couple, by means of suction, with the closed packaging, in order to make the manipulator member temporarily integral with the first external surface;

b) performing a reciprocal approach between the manipulator member and the first external surface of the packaging so that the first gripping means are in front of the first external surface, that is, with the latter interposed between the manipulator member and the object;

In accordance with one aspect of the present invention, the method also comprises at least the following steps:

c) driving the first gripping means so as to produce, by means of suction, a temporary but stable coupling between the manipulator member and the first external surface of the closed packaging, so that relative movement between the first external surface and the manipulator member is prevented, while the movement of the object inside the closed packaging is allowed.

In accordance with one aspect of the present invention, the method also comprises at least the following step:

d) moving the manipulator member so as to produce a relative movement between the closed packaging and the object. Therefore, in this step d) it is provided to shake the object inside the packaging, until causing the opening flap to stretch so as to make it easier to identify and available for a subsequent processing of the packaging, in particular for a step of cutting the stretched flap.

In accordance with another aspect of the present invention, during the step d) of moving the manipulator member, the latter moves with at least two degrees of freedom.

In accordance with another aspect of the present invention, the method also comprises another step e), in which second gripping means, opposite the first gripping means, cooperate selectively and at least temporarily with a second external surface of the packaging, opposite the first external surface, so that the relative movement between the second external surface and the second gripping means is prevented, while the free movement of the object inside the packaging is allowed.

In accordance with another aspect of the present invention, the second gripping means comprise one or more suckers, or one or more suction members, which can be selectively activated to determine a temporary coupling with the second external surface of the packaging.

In accordance with another aspect of the present invention, the object is sterilized and comprises at least one tub and/or a tray, and the steps of the method as above are preferably performed in an environment with a controlled atmosphere.

In accordance with another aspect of the present invention, the packaging is a bag, and the first external surface is a wall, fold or sheet of such bag. Similarly, the second external surface is also another wall, fold or sheet of such bag.

In accordance with another aspect of the present invention, there is provided an apparatus for stretching an opening flap of a closed packaging, containing inside it, with ample clearance, at least one object, wherein the packaging is provided with a first external surface and with the opening flap. The apparatus comprises a manipulator member having first gripping means provided with suction members configured to selectively and temporarily couple with the closed packaging, the manipulator member is configured to be taken in the proximity of the first external surface of the packaging so that the first gripping means are in front of the first external surface, that is, with the latter interposed between the manipulator member and the object, and the first gripping means are configured to be driven so as to produce, by means of suction, a temporary but stable coupling between the manipulator member and the first external surface, so that the relative movement between the first external surface and the manipulator member is prevented, while the movement of the object inside the closed packaging is allowed.

According to one aspect of the present invention, the manipulator member is configured to be moved so as to produce a relative movement between the closed packaging and the object, in order to make the object shake inside the closed packaging until causing the opening flap to stretch, so as to make it identifiable and available for a subsequent processing of the closed packaging, in particular a step of cutting the stretched flap.

In accordance with another aspect of the present invention, the suction members of the first gripping means comprise one or more suckers connected to a system for creating the suction of air.

In accordance with another aspect of the present invention, the apparatus also comprises second gripping means, opposite the first gripping means, configured to selectively and temporarily couple with a second external surface of the packaging, opposite the first external surface, so that the relative movement between the second external surface and the second gripping means is prevented, while the movement of the object inside the packaging is allowed.

In accordance with another aspect of the present invention, the second gripping means comprise at least one or more suckers connected to a system for creating the suction of air.

In accordance with another aspect of the present invention, the apparatus also comprises a support member configured to be disposed under the packaging in order to support it and possibly take it in correspondence with the first gripping means.

In accordance with another aspect of the present invention, the support member is configured to take the packaging containing the at least one object into contact also with the second gripping means. The support device is provided with apertures sized to allow the second gripping means to selectively couple with the second external surface of the packaging by passing through the sized apertures.

In accordance with another aspect of the present invention, the manipulator member is configured as a mechanical arm associated with a robot.

In accordance with another aspect of the present invention, the manipulator member is configured to move in space with at least two degrees of freedom when it determines the shaking of the at least one object inside the packaging.

In accordance with another aspect of the present invention, the apparatus is sized and configured to be inserted in a containing compartment that is sterilized and/or with a controlled atmosphere.

In accordance with another aspect of the present invention, there is provided a unit for stretching and cutting an opening flap of a packaging containing at least one object, wherein such unit comprises an apparatus as described above, and a cutting device configured to cut the opening flap after it has been stretched by the apparatus.

BRIEF DESCRIPTION OF THE DRAWINGS

These and other aspects, characteristics and advantages of the present invention will become apparent from the following description of possible embodiments, given as a non-restrictive example with reference to the attached drawings wherein.

Figure 1:
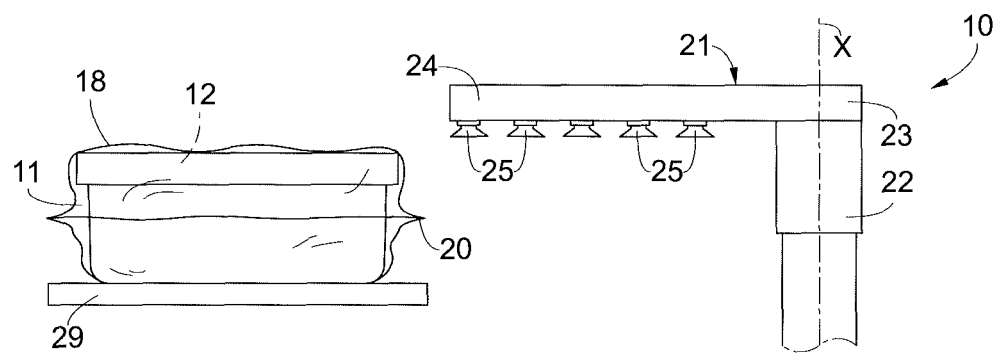
FIG. 1 is a lateral view of an apparatus for automatically stretching an opening flap of closed packagings according to the present invention and in accordance with a first embodiment, in which a packaging with an object inside it is also shown, in a first operating condition.

We must clarify that in the present description and in the claims the terms horizontal, vertical, high, low, internal, external, upper and lower with their declinations, have the sole function of better illustrating the present invention with reference to the drawings and must not be in any way used to limit the scope of the invention itself, or the field of protection defined by the attached claims. For example, by the term vertical we mean a plane that is orthogonal to the line of the horizon, or inclined, even by several degrees, for example up to 20°, with respect to the latter. Furthermore, the terms packaging and bag are to be considered as synonyms.

In addition, the person of skill in the art will recognize that certain sizes or characteristics in the drawings may have been enlarged, deformed or shown in an unconventional or non-proportional way to provide a version of the present invention that is easier to understand.

When sizes and/or values are specified in the following description, the sizes and/or values are provided for illustrative purposes only and must not be construed as limiting the scope of protection of the present invention, unless such sizes and/or values are present in the attached claims.

To facilitate comprehension, the same reference numbers have been used, where possible, to identify identical common elements in the drawings. It is understood that elements and characteristics of one embodiment can conveniently be incorporated into other embodiments without further clarifications.

DESCRIPTION OF SOME EMBODIMENTS OF THE PRESENT INVENTION

With reference to FIG. 1, an apparatus 10 according to the present invention is configured to facilitate the automatic opening of a closed packaging 11 containing at least one object 12, for example a container for the pharmaceutical, medical and/or chemical sectors. The apparatus 10, for example, can be disposed in an automated processing line of a known type, or which will be developed in the future, and which is not represented in the drawings.

Before describing the apparatus 10 in detail, we will now describe an example of the packaging 11 and of the object 12, for indicative and non-limiting purposes.

Figure 6:
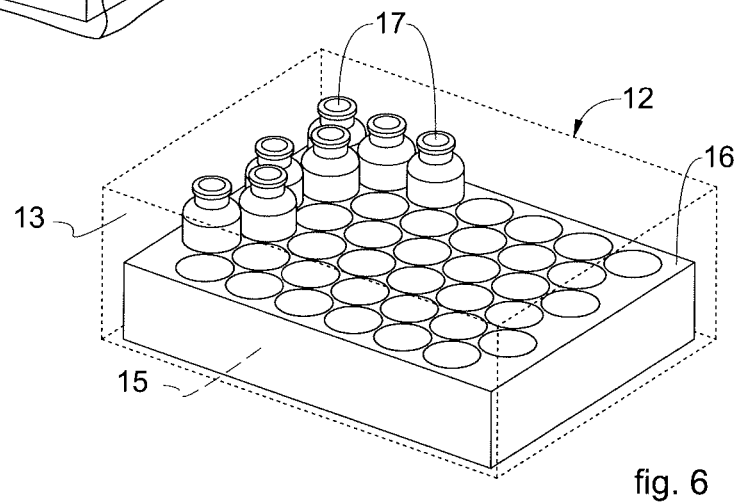
FIG. 6 is a perspective and schematic view of the object of FIG. 1, in which an example of its content is shown.

Each object 12 (FIG. 6) can comprise, or consist of, a first rigid or semi-rigid container 13 substantially in the shape of a parallelepiped in which, as is known in the state of the art, other containers can be disposed, such as for example a tub 15, which in turn contains a rack, tray, or nest, 16, which in turn can contain chemical and/or pharmaceutical products, enclosed in flasks, vials, bottles or suchlike, collectively indicated with 17.

For example, in an application in the pharmaceutical field, the standard sizes of an object 12 can be approximately 65×40×30 cm.

Figure 5:
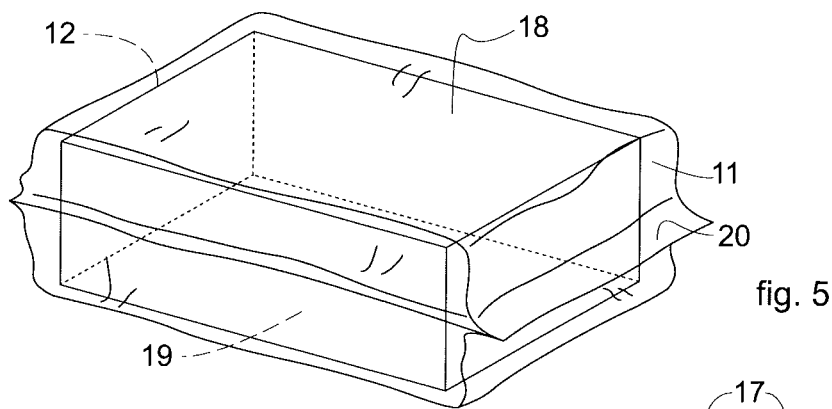
FIG. 5 is a perspective view, on an enlarged scale, of the packaging with an object inside it of FIG. 1.

The packaging 11 (FIG. 5), for example, can comprise or consist of a bag formed by two sheets 18, 19, parallel and joined to each other, for example by means of electro-welding, along their perimeter edges, so to define an opening flap 20, as is known in the state of the art.

Each of the two sheets 18, 19 therefore defines an external surface of the packaging 11. Please note that the reference numbers 18, 19 will be used indifferently to indicate these sheets as well as the corresponding external surface of the packaging 11 defined thereby.

Please note that in possible variants, not represented in the attached drawings, the packaging 11 could have different shapes from the one described above, for example consisting of a different number of sheets, for example three, four or five.

Furthermore, the packaging 11 normally has a containing capacity sufficiently greater than the volume of the object 12, for example by at least 20%, up to 100%, so that the latter, while remaining sealed in the packaging 11, can move inside it.

The packaging 11 can be made with any thin, flexible and deformable material, so that it can adapt to the shape of the object 12, such as for example polymeric material, for example a non-woven fabric, consisting of high density polyethylene fibers, tearproof but easy to cut.

In other words, during use the packaging 11 takes the shape of the object 12 contained therein, possibly collapsing around it.

With reference to FIG. 1, the apparatus 10 comprises a first movement device 21, which acts as a manipulator member and is configured to grip the packaging 11 and cause the object 12 contained therein to shake, by means of displacements and rotations in space, as will be described in detail below.

Figure 7:
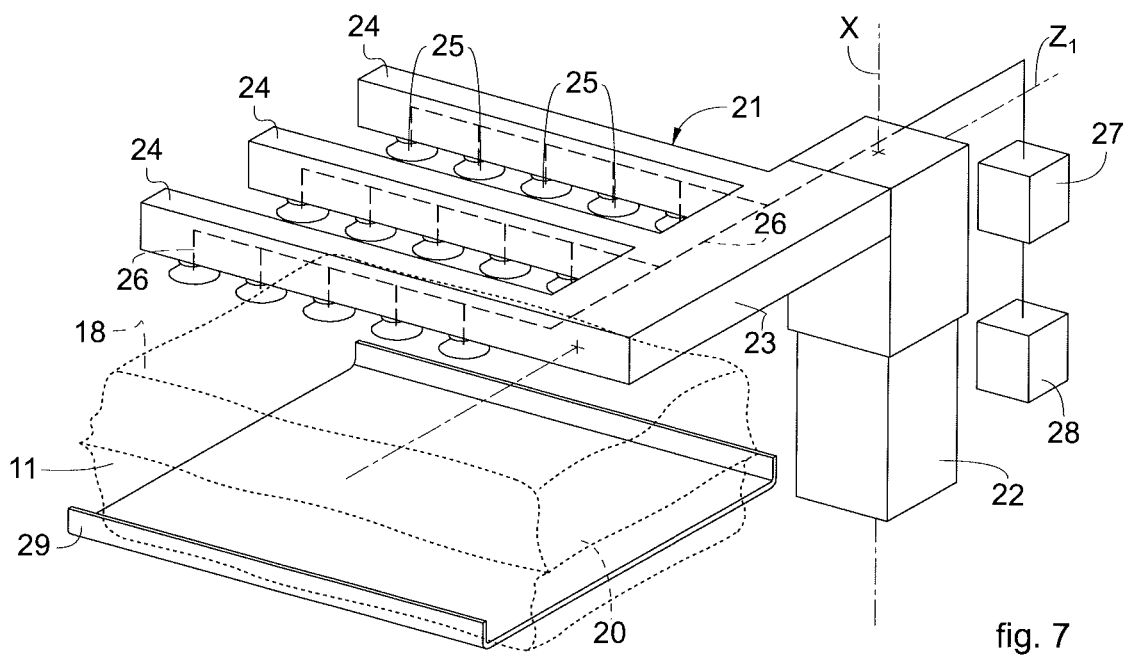
FIG. 7 is a perspective and schematic view of the apparatus of FIG. 1, in which a support for a packaging is also shown.

The first movement device 21 (FIG. 7) comprises an upright 22 having a longitudinal axis X, for example vertical, and on which there is mounted an arm 23 lying on a transverse axis Z1, substantially perpendicular to the longitudinal axis X.

The upright 22 can be, for example, of the telescopic type, so as to allow the arm 23 to move along the longitudinal axis X between an idle position and a work position, as will be described in detail below. Obviously, other technical solutions can also be implemented to allow the arm 23 to move along the longitudinal axis X.

Furthermore, the connection between the upright 22 and the arm 23 can be made in such a way as to allow the rotation of the latter around the transverse axis Z1.

Furthermore, according to some embodiments not shown in the drawings, the base of the upright 22 could be installed, instead of on a fixed structure, on a rotating support, which can be driven electrically or mechanically, and is configured to allow the upright 22 itself and consequently the arm 23 to rotate around the longitudinal axis X.

Furthermore, the arm 23 is shaped in such a way as to have one or more extensions 24 disposed cantilevered and of which, in the embodiment shown here by way of a non-limiting example, there are three. Please note that the number of extensions 24 can be chosen at will as a function of the sizes of the apparatus 10 and the sizes of the packaging 11.

In the lower part of each extension 24 there are disposed first gripping elements 25 oriented downward and configured to selectively and temporarily be associated with the external surface of the first sheet 18 of the packaging 11.

The first gripping elements 25 comprise, for example, suckers of a type known per se, or any other member capable of exerting, by applying a localized depression, an adhesion force such as to guarantee their stable, albeit temporary, coupling with the external surface of the packaging 11.

In the embodiment shown here, the first gripping elements 25 are connected, by means of suitable pipes 26, to a device for creating the suction of air 27, which can be of any known type and can comprise, for example, a compressor.

The device for creating the suction of air 27 is configured to generate an at least partial depression with respect to the atmospheric one, or to that of the compartment in which the apparatus 10 is contained.

According to other possible embodiments, the first movement device 21, or at least the first gripping elements 25, could be installed on a mechanical arm of a robot, for example anthropomorphic, in such a way as to allow the same first movement device 21 the possibility of performing movements in space with several degrees of freedom, for example six.

The apparatus 10 also comprises a tray 29 configured to take the packaging 11 containing the object 12 from a first position, distant from the apparatus (FIG. 1), to a second position, or work position, in correspondence with the first movement device 21 (FIG. 2) and in particular below the first gripping elements 25.

The tray 29 has adequate sizes, such as to guarantee that the object 12 contained in the packaging 11 is resting correctly.

The tray 29 could, for example, be installed on the arm of an automated robot, or a simple mechanical arm (not shown in the drawings), configured to take the packaging 11 containing the object 12 in cooperation with the first gripping elements 25.

Figure 8:
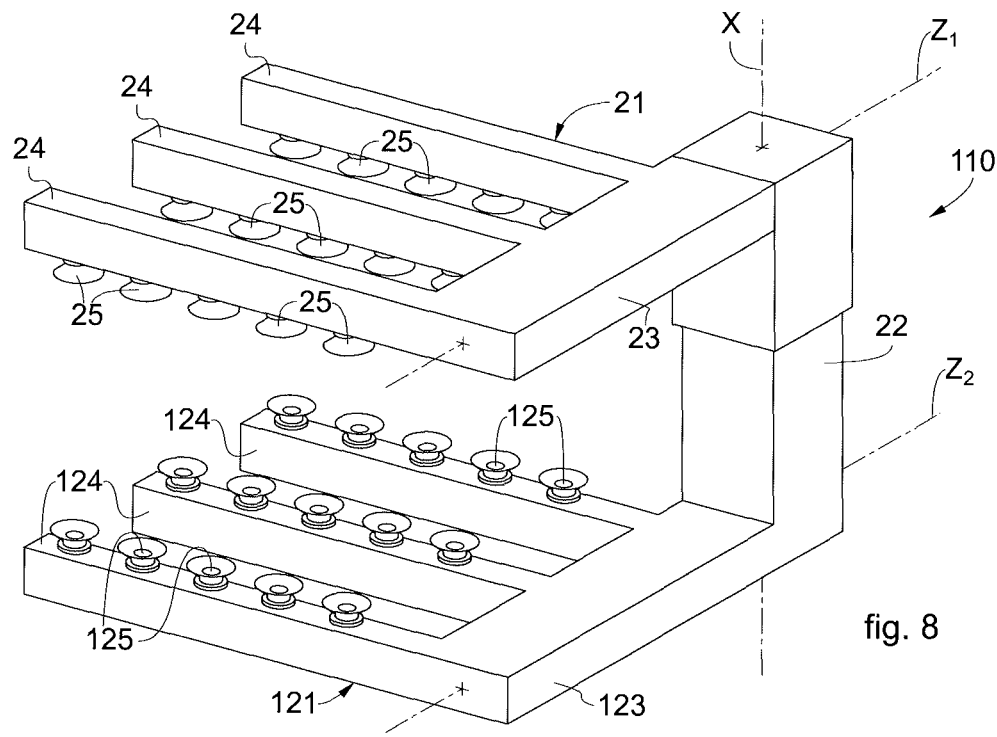
FIG. 8 is a perspective view of an apparatus for automatically stretching an opening flap of closed packagings according to the present invention, in accordance with a second embodiment.
Figure 9:
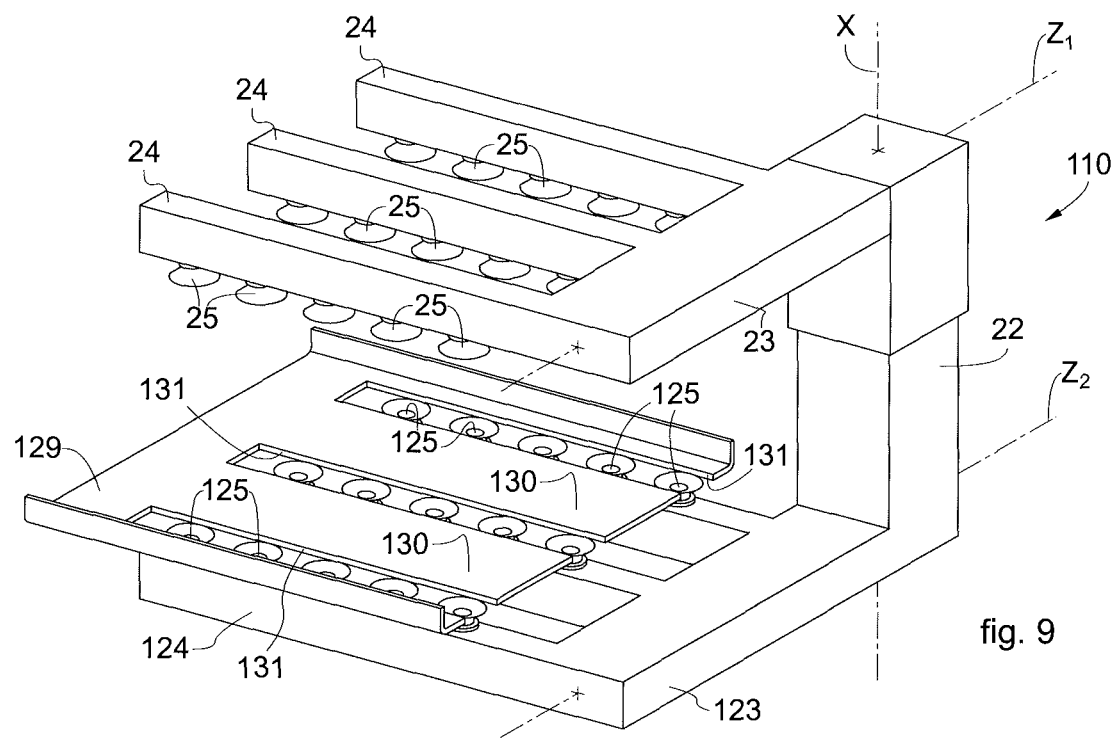
FIG. 9 is a perspective view of the apparatus of FIG. 8, in which a support for a packaging is also shown.

In accordance with another embodiment shown in FIGS. 8 and 9, an apparatus 110, similar to the apparatus 10, comprises, in addition to the previously described elements, a second movement device 121, which is substantially specular to the first movement device 21.

In particular, the second movement device 121 comprises a mechanical arm 123, lying on a transverse axis Z2, and one or more cantilevered extensions 124, of which there are three in the example provided here, but which could also be in a different number, as a function of the sizes of the packaging 11 and in particular of the second sheet 19.

Furthermore, the second movement device 121 comprises second gripping elements 125 disposed in the upper part of each of the extensions 124, oriented upward and configured to selectively and temporarily be associated with the external surface of the second sheet 19 of the packaging 11.

The second gripping elements 125, like the first gripping elements 25, can also be connected, by means of suitable pipes, not shown in the drawings, to the device for creating the suction of air 27, or to another similar device, which can be of any known type and comprise, for example, a compressor.

In the example described here, the three cantilevered extensions 124 are positioned in such a way that the second movement device 121 is opposite the first movement device 21.

Between the two movement devices 21 and 121, opposite each other, a work compartment is therefore created, in which the packaging 11 containing the object 12 can be disposed, in a subsequent operation, as will be described in detail below.

The sizes of the work compartment, and therefore the distance between the two movement devices 21, 121, in the idle position as above, have to be such as to guarantee the possibility of a correct positioning of the packaging 11 containing the object 12, and the minimum distance between the first gripping elements 25 and the second gripping elements 125 has to be sufficiently greater than the height of the object 12.

Advantageously, the second movement device 121 could have a movement system separate from the first movement device 21. For example, the second movement device 121 could move along the upright 23 by means of mechanisms different from those used by the first movement device 21. Consequently, it is easy to modify the sizes of the work compartment between the first movement device 21 and the second movement device 121.

This means that the apparatus 110, advantageously, can operate with packagings 11 containing objects 12 of different sizes, for example, with different heights.

The apparatus 110 also comprises a tray 129 which is also configured to take the packaging 11 containing the object 12 from the first position, shown in FIG. 1, to the second position, that is, below the first gripping elements 25 and therefore, in this case, also in correspondence with the second gripping elements 125 (FIG. 9).

Furthermore, the tray 129 has a shape such as to allow the second gripping elements 125 to selectively cooperate with the second external surface 19 of the packaging 11, even when the tray 129 itself is in correspondence with the second gripping elements 125.

In the example shown, the tray 129 comprises three cantilevered extensions 130, which are mating with the cantilevered extensions 124 of the second movement device 121. Between two adjacent cantilevered extensions 130 there is defined an aperture 131, sized in such a way as to allow a respective one of the cantilevered extensions 124 to be inserted inside it so that the second gripping elements 125 can reach the second external surface 19 of the packaging 11 through these apertures 131.

In this way, the tray 129 and the second movement device 121 can perform relative movements with respect to each other, for example horizontal and/or vertical, without there being any interference between them and therefore without hindering the operations of associating the packaging 11 with the second gripping elements 125.

The tray 129 could also be installed, for example, on the arm of an automated robot, of a known type and not shown in the drawings, for example configured to take the packaging 11 and the object 12 in the work compartment comprised between the first gripping elements 25 and the second gripping elements 125.

The apparatus 10, 110 is sized and configured to be inserted in a containing compartment, or work environment, that is sterilized and/or has a controlled atmosphere, of any known type whatsoever, not shown in the drawings.

The functioning of the apparatuses 10 and 110 described heretofore, which also corresponds to the method to make them function, is as follows.

We will first describe the functioning of the apparatus 10 and then we will only highlight the differences between the apparatus 110 and the apparatus 10, since many of the processing steps are common to both apparatuses.

Figure 2:
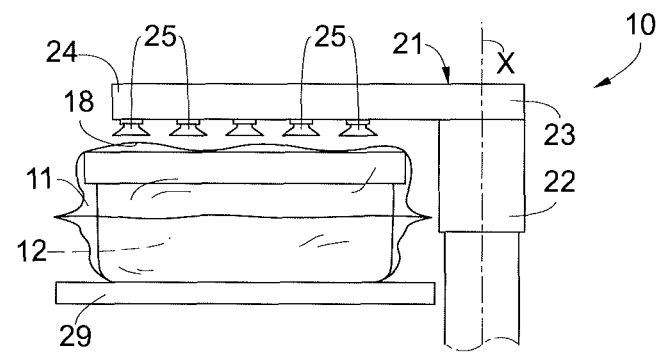
FIG. 2 is a lateral view of the apparatus of FIG. 1, in a second operating condition.

Initially, the object 12, sealed inside the packaging 11, possibly disposed on the tray 29, is in the first position, shown in FIG. 1. Then the tray 29, together with the packaging 11 and the object 12 contained therein, is transported, with any known movement mean whatsoever, for example with a robot that could be used in the context of an automated processing line, below the first gripping elements 25 (FIG. 2). Movement means that do not produce particulate matter, for example planar motors, will be favored.

Figure 3:
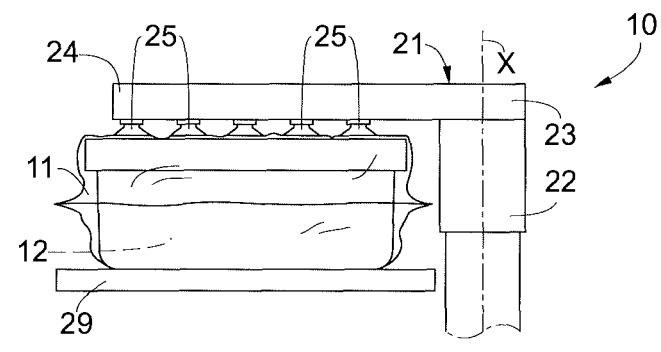
FIG. 3 is a lateral view of the apparatus of FIG. 1, in a third operating condition.

Then, in a subsequent step of association, the packaging 11, containing the object 12, disposed on the tray 29, is taken into contact with the first gripping elements 25 (FIG. 3).

The approach of the first gripping elements 25 of the first movement device 21 to the first sheet 18 of the packaging 11 occurs by means of a reciprocal approach between the first movement device 21 and the tray 29 on which the object 12 contained inside the packaging 11 is placed.

For example, the packaging 11 containing the object 12 can be taken into contact with the first gripping elements 25 directly by lifting the tray 29 installed on the arm of an automated robot, by means of a vertical displacement thereof.

Alternatively, the first gripping elements 25 could be taken into contact with the packaging 11 containing the object 12 by means of a vertical downward displacement of the first movement device 21, for example by means of the telescopic action of the upright 22, or, alternatively, by means of a vertical travel of the first movement device 21 on the same upright 22.

Should the first movement device 21 be installed on the mechanical arm of a robot, for example anthropomorphic, the latter could be programmed to automatically take the first gripping elements 25 into contact with the external surface of the first sheet 18 of the packaging 11 containing the object 12.

The apparatus 110 (FIGS. 8 and 9), on the other hand, provides an approach, as well as between the first gripping elements 25 and the external surface of the first sheet 18 of the packaging 11, also between the second gripping elements 125 and the external surface of the second sheet 19 of the same packaging 11.

For example, the object 12 contained in the packaging 11 disposed on the tray 129 could be taken into the work compartment as above and then taken into contact on the second gripping elements 125 of the second movement device 121.

The tray 129 could leave the work compartment, for example by means of a vertical downward displacement, allowed by the mating shape between the same tray 129 and the second movement device 121.

In both cases, the packaging 11 will be in contact both with the first gripping elements 25, in its upper part, that is, on the external surface of the first sheet 18, and also with the second gripping elements 125, in its lower part, that is, on the external surface of the second sheet 19.

Subsequently, the device for creating the suction of air 27 (FIG. 7) is activated, for example by means of command signals coming from a control unit 28, of a known type, which for example receives signals from contact or proximity sensors, also of a known type and not shown in the drawings, which can be installed in the apparatus 10, 110.

The suction action created by the device for creating the suction of air 27 causes a localized depression between the first gripping elements 25 and the first sheet 18 of the packaging 11, thus creating a stable grip between them, which can be interrupted at will by commanding the same device for creating the suction of a vacuum 27.

Figure 4:
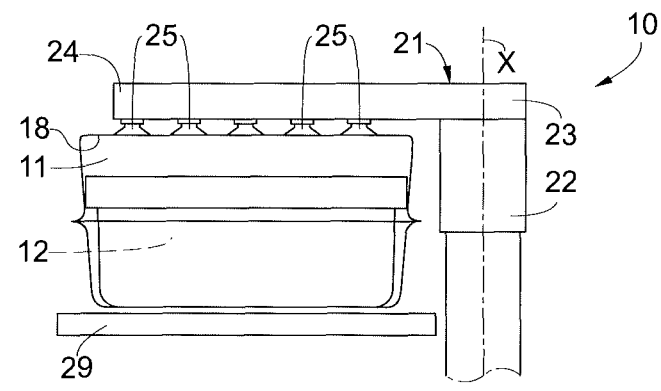
FIG. 4 is a lateral view of the apparatus of FIG. 1, in a fourth operating condition.

Consequently, the first sheet 18 of the packaging 11 will be gripped by the first gripping elements 25 of the first movement device 21, while the object 12 will not be constrained to the first gripping elements 25 and will therefore be free to move inside the packaging 11 (FIG. 4).

In the apparatus 110, the actuation of the means for creating the suction of air 27 also causes a localized depression between the second gripping elements 125 and the second sheet 19 of the packaging 11, thus also creating a stable grip between them.

The first sheet 18 of the packaging 11 will therefore be gripped by the first gripping elements 25 of the first movement device 21, and the second sheet 19 of the packaging 11 will be gripped by the second gripping elements 125 of the second movement device.

In both cases, the object 12 will thus be free to move inside the packaging 11.

Subsequently, the packaging 11 containing the object 12 will be released from the support of the tray 29, for example by means of a downward displacement of the same tray 29.

The action exerted by gravity on the mass of the object 12 will thrust the latter downward, which will at least partly drag the second sheet 19 of the packaging 11, while the upper part of the same packaging 11 will be constrained at the upper part, in a stable albeit temporary manner, to the first movement device 21. If necessary, where possible, and as a function of the type of container 17 contained in the packaging 11, the latter operation could be repeated several times, also, where necessary, by overturning the object 12 contained in the packaging 11 in order to determine an even more significant shaking of the object 12.

In this way, the weight of the object 12 will exert an extending action on the walls that form the packaging 11, making the opening flap 20 more visible and easily identifiable.

In the apparatus 110, the extending action as above could be aided by the selective reciprocal distancing between the first movement device 21 and the second movement device 121, while the first and second gripping elements, 25 and 125 respectively, are gripping onto the external surfaces defined by the sheets 18 and 19 of the packaging 11.

For example, once the first sheet 18 of the packaging 11 is gripped by the first gripping elements 25 and the second sheet 19 of the packaging 11 is gripped by the second gripping elements 125, a vertical displacement, for example in the upward direction, of the first movement element 21 would at least partly drag the packaging 11, which will in any case be stably gripped, at least temporarily, in its lower external surface by the second movement device 121.

In this way, the external surface of the packaging 11 will undergo a stretching and a consequent flattening of the first sheet 18 and of the second sheet 19.

Subsequently, the first movement device 21 will be able to perform movements and rotations in space, in order to improve the flattening action that the movements that shake the object 12 cause on the walls of the packaging 11.

The above movements in space could, for example, be vertical movements along the longitudinal axis X, and the above rotations can for example comprise rotations around the transverse axis Z1, rotations around the transverse axis Z2, or around the same longitudinal axis X.

For example, the first movement device 21 could perform vertical oscillations, horizontal oscillations, or rotations so that the object 12 can move freely inside the packaging 11, or a combination thereof, thus exerting a more effective flattening and extending action on all the walls that form the packaging 11, that is, on its external surface.

In this step, the first movement device 21 and the second movement device 121 of the apparatus 110 could be configured to perform movements in different directions, for example opposite or discordant with respect each other.

For example, the first movement device 21 could perform horizontal oscillations while the second movement device 121 could, in the same time interval, perform vertical oscillations, or it could perform horizontal oscillations out of phase with respect to those of the first movement device 21.

Subsequently, once the external surface of the packaging 11 is flattened and extended by means of the action exerted by the first movement device 21 and possibly also by the second movement device 121, it will be much easier, faster and more intuitive to identify the opening flap 20, making it possible to perform such identification even for automated apparatuses or machines that can stretch the opening flap 20, by means of any known device whatsoever or which will be developed in the future, and which is not shown in the drawings.

Figure 10:
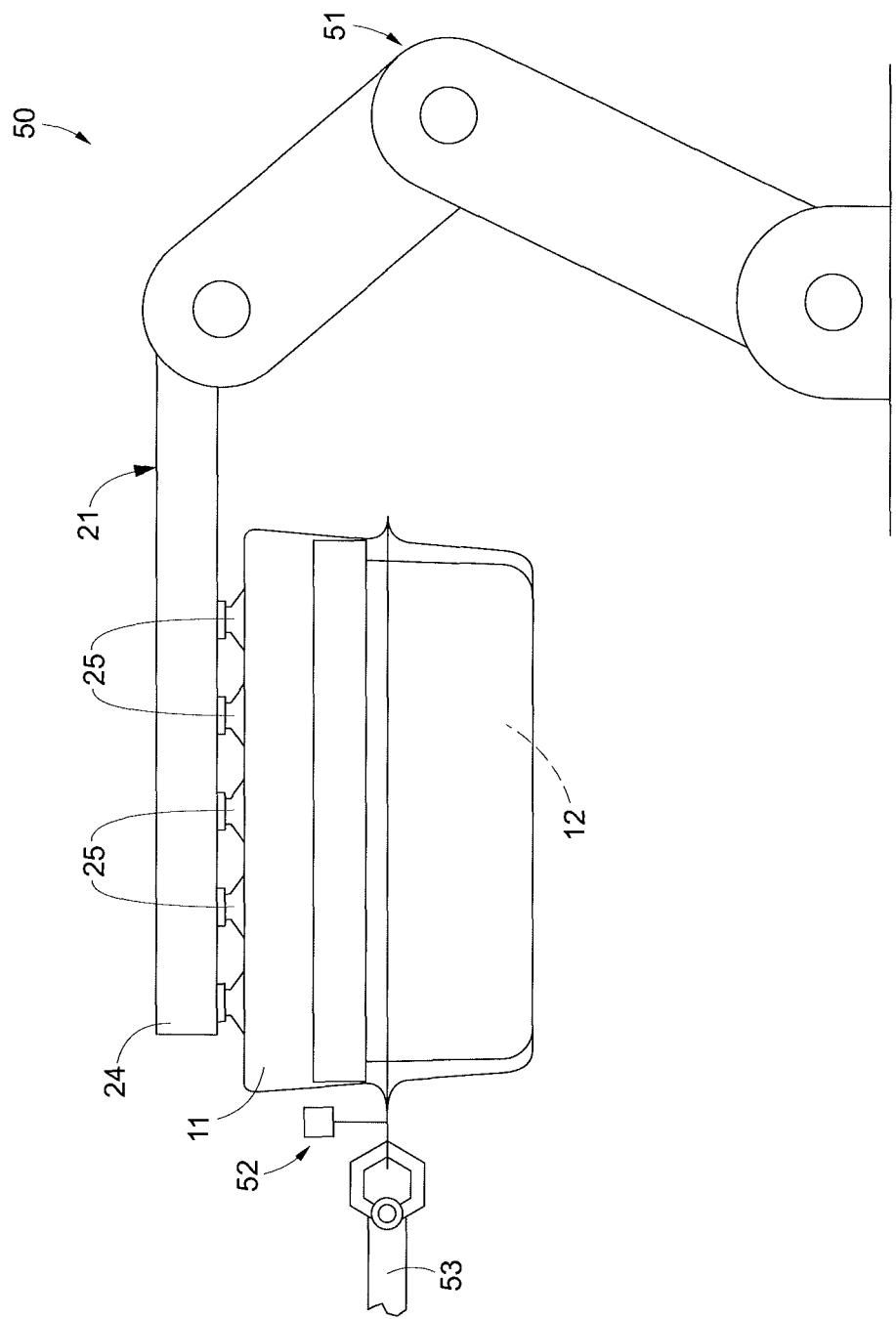
FIG. 10 is a schematic lateral view of a unit for stretching and cutting an opening flap of a closed packaging comprising an apparatus according to the present invention.

By way of example, with particular reference to FIG. 10, the apparatus 10, 110 can advantageously be used in the context of a unit for stretching and cutting the opening flap 20, identified as a whole by the reference number 50, and hereafter also referred to only as a "unit" for short. The unit 50 comprises the apparatus 10, 110. Please note that the example shown in FIG. 10 shows the apparatus 10, but it is quite clear that the unit 50 could comprise, in a completely equivalent manner, the apparatus 110 shown in FIGS. 8 and 9 instead of the apparatus 10. In the example shown, the manipulator member 21 is associated with a robot 51, for example a robot with six degrees of freedom comprising a plurality of arms articulated with respect to each other.

The unit 50 also comprises a cutting device 52, of a known type and not described here in detail. The cutting device 52 comprises a mobile or fixed cutting blade, or an equivalent cutting or shearing member capable of cutting the opening flap 20 in order to separate it from the packaging and thus determine its opening. This preferably occurs in a hygienically sterile environment.

As a function of the conformation of the cutting device 52, the unit 50 can comprise a gripping member 53 configured to grip the free end of the opening flap 20 at least during the cutting, in such a way as to keep it suitably stretched and thus facilitate the cutting operation performed by the cutting device 52.

It is clear that modifications and/or additions of parts or steps may be made to the apparatuses 10 and 110 as described heretofore, without departing from the field and scope of the present invention as defined by the claims.

It is also clear that, although the present invention has been described with reference to some specific examples, a person of skill in the art shall certainly be able to achieve many other equivalent forms of apparatuses and/or methods for automatically stretching an opening flap of closed packagings, all coming within the scope of the present invention.

In the following claims, the sole purpose of the references in brackets is to facilitate reading and they must not be considered as restrictive factors with regard to the field of protection defined by the same claims.

The invention claimed is:

1. Method for stretching an opening flap of a closed bag, loosely containing at least one object, wherein said closed bag is provided with a first external surface and with said opening flap, said method comprising:
   a) providing a manipulator including a first suction member configured to selectively and temporarily couple, by means of suction, with said closed bag;
   b) reciprocally bring closer to each other said manipulator and said closed bag;
   c) coupling said first suction member of said manipulator with said first external surface of said closed bag and activating said first suction member, so that a relative movement between said first external surface and said first suction member is prevented by a suction force, wherein said first suction member contacts the external surface of the closed bag at a certain distance from the opening flap; and
   d) while keeping active said suction force, moving said first suction member to produce a relative movement between said closed bag and the contained at least one object, said step of moving said first suction member being performed in such a way as to shake said at least one object inside said closed bag until flattening said opening flap; and
   e) gripping the flattened opening flap with a gripping tool and cutting the closed bag in a zone between the gripped flattened opening flap and the least one object.

2. Method as in claim 1, wherein said step d) includes moving said first suction member at least with two degrees of freedom.

3. Method as in claim 1, further comprising f), in which a second suction member opposite said first suction member engages selectively and at least temporarily, a second external surface of said closed bag, opposite said first external surface, with said at least one object in between, and wherein said first and second suction members are moved together in a coordinated manner to shake the at least one object inside the closed bag until flattening the opening flap.

4. Method as in claim 3, wherein said second suction member includes a plurality of suckers, each sucker being selectively activatable to determine a temporary coupling with said second external surface of said closed bag.

5. Method as in claim 1, wherein said at least one object is sterilized and comprises at least one tub and/or a tray.

6. Method as in claim 1, wherein said first external surface is a wall or a sheet of said closed bag.

7. Apparatus for stretching an opening flap of a closed bag, loosely containing at least one object, wherein said closed bag is provided with a first external surface and with said opening flap, wherein said apparatus comprises a manipulator having a first suction member configured to selectively and temporarily couple with said closed bag, wherein said manipulator is configured to be taken in the proximity of said first external surface of said closed bag so that said first suction member is in front of said first external surface, and wherein said first suction member is configured to be activated to temporary but stably coupling said first external surface, so that a relative movement between said first external surface and said first suction member is prevented, while the movement of said at least one object inside said closed bag is allowed, wherein said first suction member is configured to be moved to produce a relative movement between said closed bag and said at least one object, in order to make said at least one object shake inside said closed bag until causing said opening flap to flatten, so as to make said flattened opening flap identifiable, and wherein said apparatus further includes a gripping tool configured to grip the flattened opening flap, and a cutting member configured to cut the closed bag in a zone between the flattened opening flap gripped by said gripping tool and said least one object.

8. Apparatus as in claim 7, wherein first suction member includes a plurality of suckers connected to a system for creating the suction of air.

9. Apparatus as in claim 7, further comprising a second suction member opposite said first suction member and configured to selectively and temporarily couple with a second external surface of said closed bag, opposite said first external surface, so that the relative movement between said second external surface and said second suction member is prevented, while the movement of said at least one object inside said closed bag is allowed.

10. Apparatus as in claim 9, wherein said second suction member includes a plurality of suckers connected to a system for creating the suction of air.

11. Apparatus as in claim 9, further comprising a support member configured to support said closed bag and possibly take it in correspondence with said first suction member.

12. Apparatus as in claim 11, wherein said support device is configured to take said closed bag containing said at least one object into contact also with said second suction member, and wherein said support device is provided with apertures, sized to allow said second suction member to selectively pass through said apertures to couple with said second external surface of said closed bag.

13. Apparatus as in claim 7, wherein said manipulator is configured as a mechanical arm associated to a robot.

14. Apparatus as in claim 7, wherein said manipulator is configured to move in space with at least two degrees of freedom when it causes said at least one object to shake inside said closed bag.

* * * * *